Jan. 13, 1953   J. W. FLUDE   2,625,129
BUOY-TYPE DETECTOR CARRIER
Original Filed Sept. 16, 1939
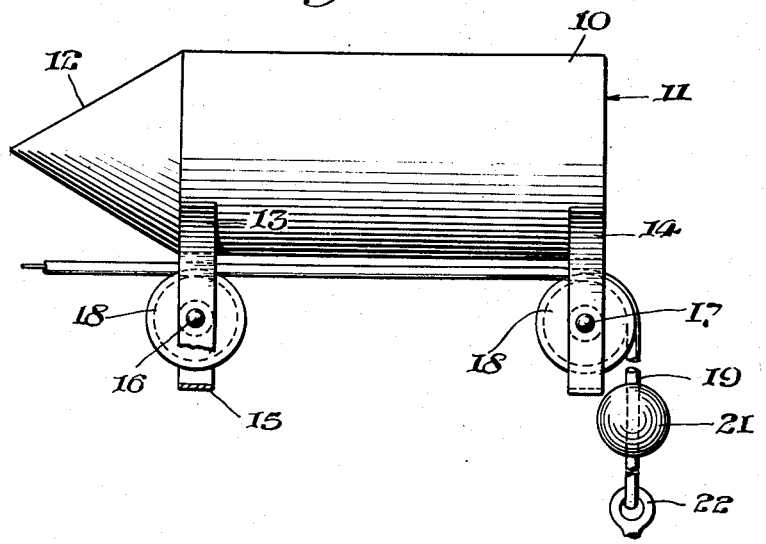
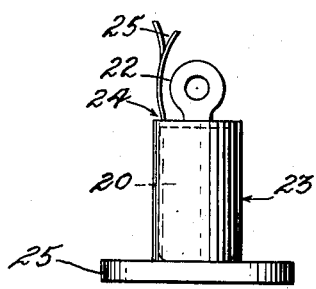
INVENTOR.
John W. Flude
BY Cousins & Cousins
ATTORNEYS, Patented Jan. 13, 1953

2,625,129

UNITED STATES PATENT OFFICE 2,625,129

BUOY-TYPE DETECTOR CARRIER

John W. Flude, Houston, Tex.

Application March 7, 1942, Serial No. 433,731, now Patent No. 2,423,591, dated July 8, 1947, which is a division of application Serial No. 295,198, September 16, 1939, now Patent No. 2,283,200, dated May 19, 1942. Divided and this application May 28, 1947, Serial No. 750,943

4 Claims. (Cl. 114—235)

This invention relates to detector carriers for seismographic exploration and is a division of copending application 433,731, filed March 7, 1942, now Patent 2,423,591, dated July 8, 1947, which is in turn a division of application 295,198 filed September 16, 1939, which was issued May 19, 1942, with Patent Number 2,283,200.

In the art of underseas surveying, fully described in U. S. Patent No. 2,283,200, it is necessary to provide apparatus for carrying and positioning seismic detectors either upon the ocean floor or at some desired depth below the surface of the water.

Accordingly, it is an object of this invention to provide a detector carrier which may be towed through the water and which will position the seismic detector or other geophysical instrument during seismic surveying.

Another object of this invention is to provide a carrier which may be incorporated into a tow comprising a plurality of similar carriers.

A further object of this invention is to provide a carrier which will maintain the detector or other instrument in an upright position upon the ocean bottom.

An object of this invention is to provide a carrier which will maintain the instrument carried at a specific depth below the surface of the water during the taking of readings.

A feature of this invention is the use of sheaves to retain and guide the towing cable.

Another feature of this invention is the use of a stop member to limit the depth to which the instrument can sink.

A further feature of this invention is its buoy-like construction which enables it to be towed through the water between readings.

The invention consists of the construction, combination and arrangement of parts, as herein illustrated, described and claimed.

In the accompanying drawings, forming part hereof, are illustrated two forms of embodiment of the invention, in which drawings similar reference characters designate corresponding parts, and in which:

Figure 1 is a side elevation of one form of carrier according to this invention.

Figure 2 is a side elevation of one form of detector housing that may be used with the carrier shown in Figure 1.

Referring to the drawings, and particularly Figure 1, 10 indicates a cylindrical float member, one end of which is closed by a flat circular plate 11 and the other, or forward end, by a conical member 12. The float assembly is securely held together as by welding in the form of a water-tight float. A pair of straps 13, 14 are secured to the outside of the float 10, the ends of which follow the contour of the cylindrical surface thereof. The central portion of the straps 13, 14 extends vertically downward in the form of a U, as at 15, and an aperture at 16, in order to serve as bearings for the shafts 17. Sheaves 18 are attached to the shafts 17.

This construction enables a cable 19, by or through which one or more detectors 20 may be connected to the towing vessel (not shown) to be reeved through the sheaves, as shown in Figure 1. The end of the cable is preferably provided with a weight 21. This weight 21 is located somewhat above the end of the cable 19, the end of which is secured to an eye 22 on a housing 23 in which a detector 20 is contained.

The housing 23 is preferably provided with an aperture 24 through which a pair of wires 25 may be extended to connect the detector 20 with the towing vessel, as through conductors located within the towing cable 19. Where the housing 23 is to be positioned upon the ocean bottom for taking readings, it is desirable to provide a relatively heavy base 25 thereon (see Figure 2).

Thus, when the towing cable 19 is slacked off, the combined weights of the housing 23, the detector 20, the weight 21 and the detector base 25 cause the detectors to settle rapidly to the bottom, as the cable 19 runs freely through the sheaves. When the detector is on the bottom, the weight 21 serves to absorb the strain of any small jerks on the cable 19 caused by the float 10 bobbing up and down in the water. The weight 21 also operates as a stop to limit the forward travel of the cable 19 through the sheaves when the cable 19 is again placed under tension, at which time the float 10 again starts its forward travel in the direction of the tow.

A plurality of floats like that shown in Figure 1 may be towed by securing them upon separate extensions or taps from a main cable, each tap being at least twice as long as the depth of the water to be surveyed. When the towing vessel is in motion, the device, due to water resistance, will be at the extremity of the tap, and supporting the detector. When the towing cable is released by the towing vessel, water resistance on the cable and device will tend to stop its forward motion and gravity will cause the detector to sink to the bottom. Gravity will also cause the main towing cable to sink to the bottom. Therefore, if the float is to remain on the surface, (which may be desirable though not necessary) the tap must be more than twice the water depth in length. For instance, the taps may be as much as 250 feet long.

Having thus fully described the invention, what is claimed as new and desired to be secured by Letters Patent of the United States, is:

1. An apparatus for underwater seismographic exploration, comprising in combination, a float, a towing cable, a seismic detector secured to one end of the cable, sheaves secured to the underside of the float, said cable being threaded through the sheaves so as to permit the cable to run freely therethrough and deposit the detector upon the surface to be explored.

2. An apparatus for underwater seismographic exploration, comprising in combination, a float, a towing cable, a detector housing, a seismic detector in said housing secured to one end of the cable, sheaves secured to the underside of the float, said cable being threaded through the sheaves so as to permit the cable to run freely therethrough and deposit the detector upon the surface to be explored.

3. An apparatus for underwater seismographic exploration, comprising in combination, a float, a towing cable, a detector housing having a weighted base thereon, a seismic detector in said housing secured to one end of the cable, sheaves secured to the underside of the float, said cable being threaded through the sheaves so as to permit the cable to run freely therethrough and deposit the detector upon the surface to be explored.

4. An apparatus for underwater seismographic exploration, comprising in combination, a float, a towing cable, a seismic detector secured to one end of the cable, a weight attached to the cable between the detector and the float and spaced from the said detector sheaves secured to the underside of the float, said cable being threaded through the sheaves so as to permit the cable to run freely therethrough and deposit the detector upon the surface to be explored.

JOHN W. FLUDE.

REFERENCES CITED

The following references are of record in the file of this patent:

UNITED STATES PATENTS

| Number | Name | Date |
|---|---|---|
| 691,407 | Pacetty | Jan. 21, 1902 |
| 1,094,700 | Bundgens | Apr. 28, 1914 |
| 1,253,482 | Gault | Jan. 15, 1918 |
| 1,308,168 | Courvoirsier | July 1, 1918 |
| 1,329,225 | Burke | Jan. 27, 1920 |
| 1,344,074 | Williams | June 22, 1920 |
| 1,348,595 | Staud | Aug. 3, 1920 |
| 1,390,097 | Donaire | Sept. 6, 1921 |
| 1,973,719 | Lake | Sept. 18, 1934 |

FOREIGN PATENTS

| Number | Country | Date |
|---|---|---|
| 21,782 | Great Britain | of 1893 |
| 485,173 | Great Britain | May 13, 1938 |